C. W. HAMBROCK.
LAMP BRACKET FOR BICYCLES.
APPLICATION FILED MAY 9, 1921.

1,427,532. Patented Aug. 29, 1922.

Inventor
Carl W. Hambrock,
By Walter J. Burns
Attorney

UNITED STATES PATENT OFFICE.

CARL W. HAMBROCK, OF FORT WAYNE, INDIANA.

LAMP BRACKET FOR BICYCLES.

1,427,532.   Specification of Letters Patent.   Patented Aug. 29, 1922.

Application filed May 9, 1921. Serial No. 467,975.

*To all whom it may concern:*

Be it known that I, CARL W. HAMBROCK, a citizen of the United States of America, and resident of Fort Wayne, in the county of Allen and State of Indiana, have invented certain new and useful Improvements in Lamp Brackets for Bicycles, of which the following is a specification.

This invention relates to improvements in lamp brackets for bicycles and the object thereof is to provide a support for a flash lamp adapted to be attached to a bicycle and which will admit of the lamp being held in various adjusted positions so that its rays may be directed laterally and vertically as well as horizontally. Another object of the invention is to so construct the device that the lamp may be readily detached and replaced.

These objects are accomplished by the construction illustrated in the accompanying drawings in which:—

Similar characters of reference indicate corresponding parts in both views and referring now to the same:—

Figure 1:
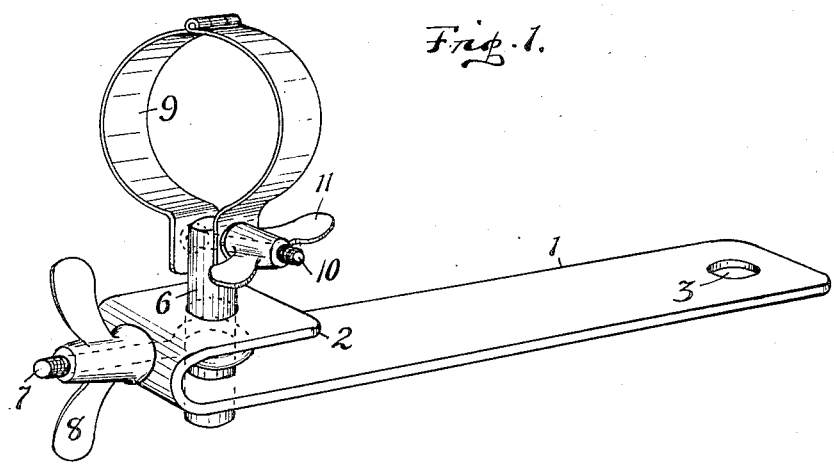
Fig. 1 is a perspective view of a bracket embodying the invention.
Figure 2:
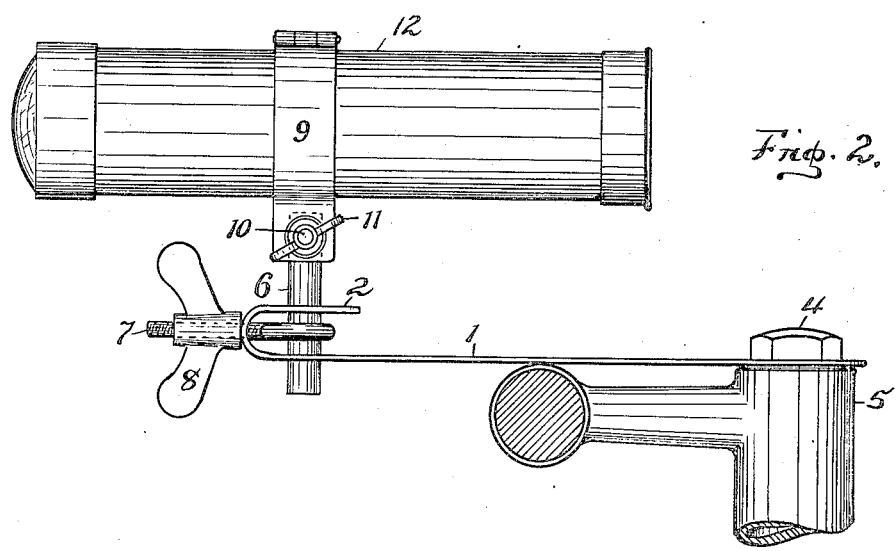
Fig. 2 is a side elevation of the same including the lamp and the head of a bicycle to which the bracket is attached.

1 is a spring bar having a hook 2 formed at one end thereof and having a perforation 3 in its opposite end for the reception of the cap-screw 4 of the bicycle 5. A lamp post 6 extends vertically through the hooked end of the plate and an eye-bolt 7 is arranged with its stem extending through the front end of the hook and with its head surrounding the lamp post. A wing-nut 8 on the stem of the eye-bolt bears against the outer end of the hook drawing the eye-bolt outwardly so as to bind the post rigidly in adjusted positions.

A hinged clamp 9 is pivotally secured to the top of the lamp post by a screw 10 having a wing-nut 11, the screw and nut being so arranged as to secure the clamp rigidly in adjusted positions on the post. The clamp is suitably shaped so as to encompass the barrel of a flash lamp 12 and hold it securely when the wing-nut 11 is tightened.

In using the invention the spring bar is secured to the head of the bicycle by means of the cap-screw 4 and the lamp post is positioned in the hooked end of the bar and in the head of the eye-bolt 7. The lamp is secured in the clamp which is tightened about the lamp and on the post by manipulating the wing-nut 11. While thus held, the lamp may be tilted in a vertical plane or turned in a horizontal plane as the clamp is pivotally supported on the bolt 10 and the post is adjustably movable upon its axis in the spring bar.

By this construction the lamp may be removed from the bicycle by either releasing the clamp from the barrel of the lamp or removing the lamp together with the clamp and post from the spring bar.

What I claim is:—

In a device of the class described, a spring bar having a hooked end; an eye bolt the stem of which extends through the front end of the hook and provided with a nut; a lamp post extending through the hook and the eye-bolt; and a clamp pivotally mounted on the top of the lamp post.

In testimony whereof I affix my signature, in presence of two witnesses.

CARL W. HAMBROCK.

Witnesses:
MATILDA METTLER,
WALTER G. BURNS.